Jan. 2, 1934.   A. C. KOSTKA   1,942,297
VEHICLE SIGNAL SWITCH
Filed Sept. 9, 1932   2 Sheets-Sheet 1
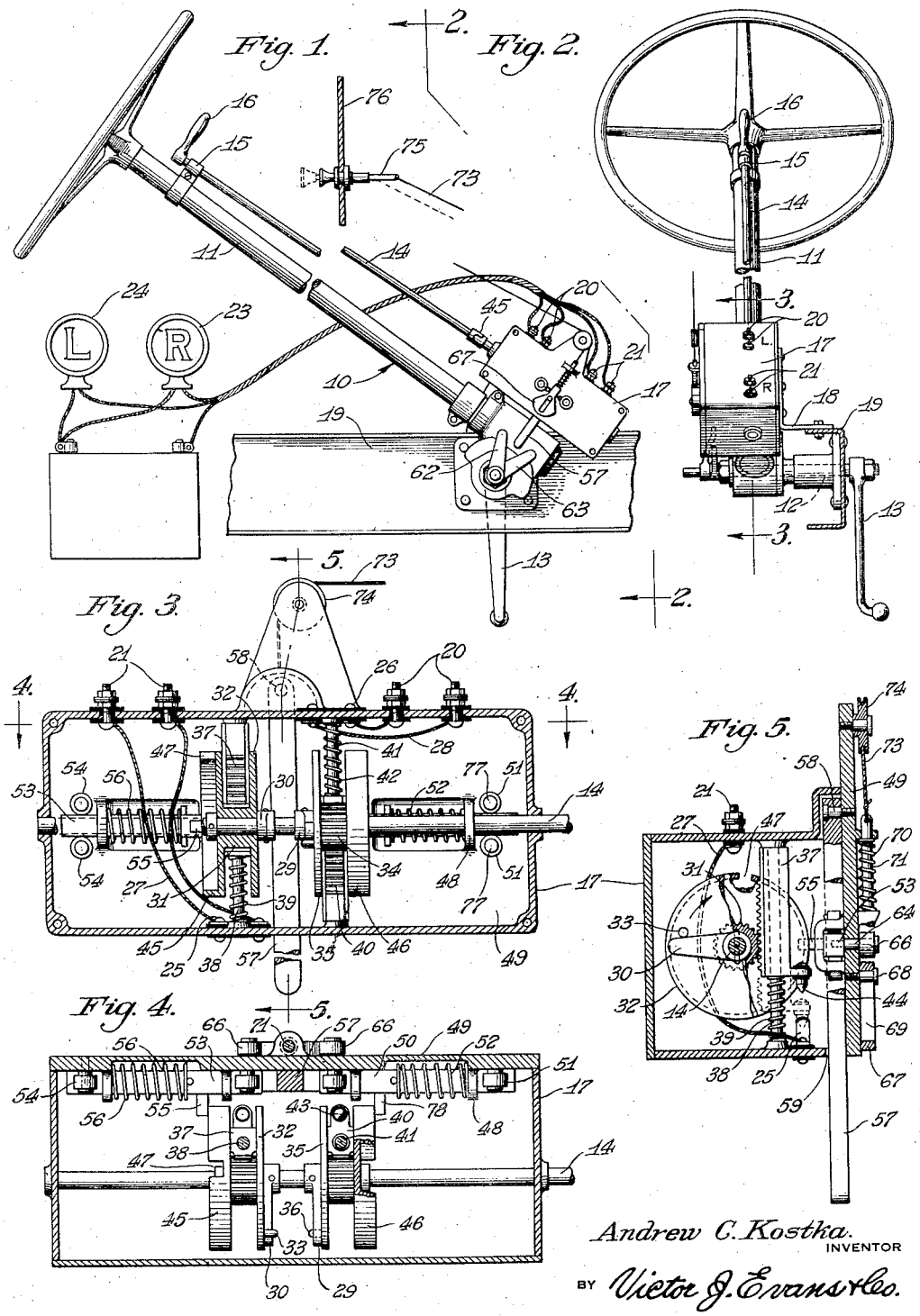
Andrew C. Kostka.
INVENTOR
BY Victor J. Evans & Co.
HIS ATTORNEYS Jan. 2, 1934.  A. C. KOSTKA  1,942,297
VEHICLE SIGNAL SWITCH
Filed Sept. 9, 1932   2 Sheets-Sheet 2
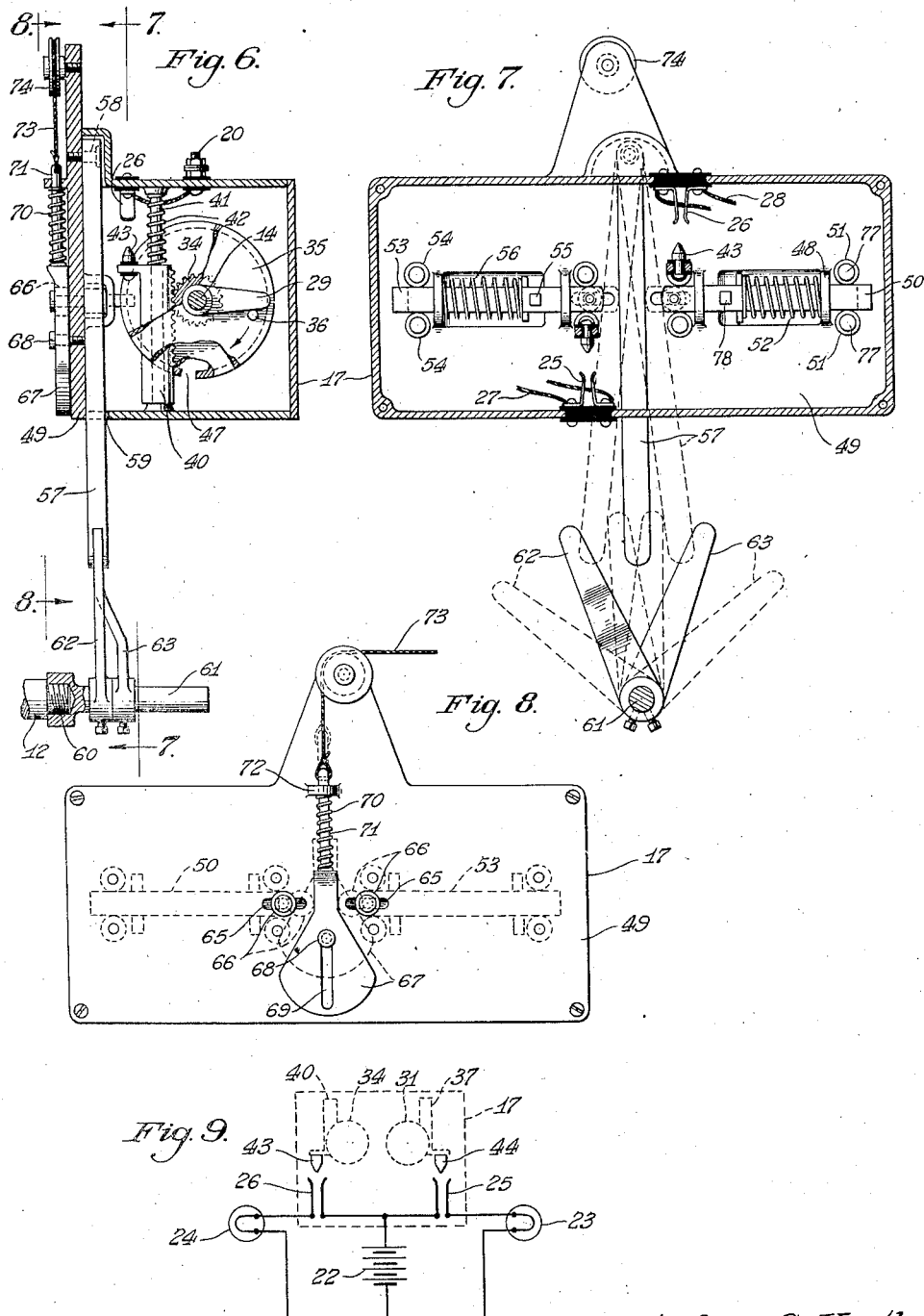
Andrew C. Kostka.
INVENTOR
BY Victor J. Evans & Co.
HIS ATTORNEYS Patented Jan. 2, 1934

1,942,297

UNITED STATES PATENT OFFICE 1,942,297

VEHICLE SIGNAL SWITCH

Andrew C. Kostka, Chicago, Ill.

Application September 9, 1932. Serial No. 632,421

9 Claims. (Cl. 200—59)

This invention relates to certain novel improvements in vehicle signal switches, and has for its principal object the provision of an improved construction of this character which will be highly efficient in use and economical in manufacture.

An object of this invention is to provide a novel direction of turn signal switch for automotive vehicles.

The new device includes similar or companion switch mechanisms, operable by the steering apparatus of the vehicle to close circuit selectively to either a right or a left turn signal light. These mechanisms are also reset by means associated with the steering apparatus of the vehicle when the driver straightens out the front wheels. It is another object of the invention to provide means, independent of the steering apparatus, to extinguish the right or left turn light, as the case may be, and to reset the corresponding circuit closing mechanism in case the driver decides, after having indicated a right or left turn, not to make the turn.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a side elevational view showing a preferred form of the invention associated with the steering mechanism of an automotive vehicle;

Fig. 2 is an elevational view on line 2—2 in Fig. 1;

Fig. 3 is a sectional view on line 3—3 in Fig. 2;

Fig. 4 is a sectional view on line 4—4 in Fig. 3;

Fig. 5 is a sectional view on line 5—5 in Fig. 3;

Fig. 6 is a sectional view of a part of the mechanism;

Fig. 7 is a sectional view on line 7—7 in Fig. 6;

Fig. 8 is an elevational view on line 8—8 in Fig. 6; and

Fig. 9 is a schematic wiring diagram of the electrical circuit embodied in the invention.

In the drawings, which illustrate a preferred form of the invention, 10 generally indicates the conventional steering apparatus of an automotive vehicle. This apparatus includes the steering column 11, steering rod (not shown) therein, steering gear connecting rod 12, and steering arm 13; the connecting rod 12 and the steering rod in column 11 having the usual worm and gear connection (not shown).

In practicing the invention the upper end portion of an operating shaft 14 is rotatably journaled in a bracket 15 mounted on the steering column 11, and this shaft 14 has a handle 16 at its upper end. The lower end portion of the operating rod 14 extends through and is journaled in a casing 17 that is mounted by means of a bracket 18, on the vehicle chassis 19. Mounted on the casing 17 are pairs of insulated terminal posts 20 and 21. The terminal posts 20 are connected to the battery 22 and to a "right" turn signal light 23 which may be mounted on the rear of the vehicle. The terminal posts 21 are connected in series with the battery 22 and a "left" turn signal light 24 (Fig. 9).

Mounted on the bottom wall of casing 17 is a pair of insulated spring contact jacks 25, (Fig. 7), and mounted on the top wall of the casing 17 is a similar pair of insulated spring contact jacks 26. The jacks 25 are electrically connected to the terminal posts 21 by conductors 27 and the jacks 26 are electrically connected to the terminal posts 20 by conductors 28. The present invention includes mechanism for selectively bridging the contact jacks 25 and 26 to close circuit, respectively, to either the "right" turn light 23 or to the "left" turn light 24. This is accomplished by manipulating the handle 16 and shaft 14 and circuit-closing mechanisms operable thereby in the casing 17 and now to be described.

To this end there is fixed on the shaft 14 in the casing 17 a pair of arms 29 and 30 which are spaced, circumferentially of the shaft 14. Floating on the shaft 14 adjacent the arm 30 is a gear 31 which has an annular flange 32 from which projects a lug 33. A similar gear 34 floats on the shaft 14 adjacent the arm 29 and this gear 34 has an annular flange 35 from which projects a lug 36. The gear 31 meshes (Fig. 5) with a rack 37 that is slidable upon a post 38 that extends transversely through the casing 17, and this rack 37 is normally urged upwardly by a spring 39 arranged on the post 38. In a similar manner, the gear 34 meshes with a rack 40 (Fig. 3) which is slidable upon a post 41 that extends transversely through the casing 17 parallel to the post 38. This rack 40 is normally urged downwardly by a spring 42 arranged on the post 41.

On the upper end of the rack 40 is an insulated contact 43 and on the lower end of the rack 37 is an insulated contact 44. To apprise the following driver of his intention to make a right turn, the driver of the vehicle employing the invention turns the handle 16 and shaft 14 to the right, as seen looking down the steering column 11, thereby rotating shaft 14 clockwise (Fig. 4); a conventional universal joint structure 45 being provided at the bend or angle in the shaft 14 (Fig. 1) to permit rotation of the shaft at this bend or angle therein. Clockwise rotation of shaft 14 (Fig. 5) causes the arm 30 thereon to engage the lug 33, thereby rotating the annular flange 32 of the gear 31, and the gear 31 itself, (clockwise, Fig. 5). This rotation of gear 31 lowers the rack 37, in mesh therewith, and inserts the contact 44 between the jacks 25, thereby bridging the jacks 25 and closing circuit to the "right" turn signal light 23. During this movement of shaft 14, arm 30, gear 31 and rack 37, arm 29 moves away from lug 36 and the gear 34 consequently remains motionless, so that the "left" turn signal light 24 remains dark or out.

However, when the operator desires to indicate a "left" turn to the following driver, he manipulates handle 16 and shaft 14 to the left, as seen looking down the steering column in Fig. 1, thereby causing the shaft 14 to rotate counterclockwise, as seen looking to the left from the right side of Fig. 4. This causes the arm 29 to engage lug 36 and thereby rotate flange 35 and gear 34 (counterclockwise, looking from right to left in Fig. 4); thus raising rack 40, in mesh with gear 34, and inserting the contact 43 carried by rack 40 between and so as to bridge the jacks 26. This closes circuit to the "left" turn light 24. During this movement of shaft 14, arm 29, gear 34 and rack 40, arm 30 moves away from lug 33, and gear 31, and rack 37 remain motionless, so that the "right" turn signal light 23 remains dark or out.

In order to keep the proper direction-of-turn indicating light illuminated during the time the operator of the vehicle is making a turn, the following latching mechanism is provided for the circuit-closing mechanism associated with the left turn light 24. To this end there is made integral with the gear 31 a ring 45, and a similar ring 46 is made integral with the gear 34 (Fig. 4). In each of these rings 45 and 46 a notch 47 is provided (Figs. 4 and 5). Slidably mounted in apertured bosses 48 formed on the inner side of the wall 49 of the casing 17 is a bar 50 which is guided between pairs of rollers 51 mounted on studs 77 which project from the wall 49 of casing 17. A lug 78 projects from this slide bar 50 and a spring 52 arranged on this slide bar 50 urges the same (to the left, Fig. 4). The spring 52 forces the lug 78 against the ring 46 so that when the shaft 14 is rotated to indicate a "left" turn, and the arm 29 engages the lug 36 and rotates flange 35, gear 34 and ring 46 (counterclockwise, looking from right to left in Fig. 4) the spring 52 urges the lug 78 into the notch 47 formed in the ring 46, as the rack 40 is raised by rotation of gear 34 to dispose the contact 43 in bridging or circuit-closing relationship between the jacks 26. In this manner the circuit to the left turn light 24 is kept closed until the vehicle completes the left turn, whereupon the lug 51 is released from the notch 47 formed in the ring 46, by means hereinafter to be described, and the spring 42 forces the rack 40 downwardly, disengaging the contact 43 from the jacks 26 and opening circuit to the left turn light 26 at the time the left turn is completed.

A similar latching mechanism is provided for the circuit closing mechanism associated with the right turn light 23, to keep the circuit to the right turn light 23 closed during the time the vehicle is completing a right turn. To this end a slide bar 53 is mounted on the wall 49 of casing 17 in parallel relationship to the slide bar 50 and this slide bar 53 is guided between pairs of rollers 54, similar to the rollers 51. A lug 55 projects from the slide bar 53. A spring 56 urges the slide bar 53 (to the right, Fig. 4) forcing the lug 55 against the ring 45 so that when the driver moves the shaft 14 to indicate a left turn, and the arm 30, being rotated (clockwise, Fig. 5) into engagement with the lug 33 rotates the flange 32, gear 31, and ring 45, to lower the rack 37, the spring 56 forces the lug 55 into the notch 47 formed in the ring 45, at the time when the rack 37 lowers the contact 44 into bridging or circuit closing relationship between the jacks 25 to close circuit to the right turn light 23. In this manner circuit to the right turn light 23 is kept closed until the driver completes the right turn, whereupon the lug 55 is released from the notch 47 formed in ring 45 by means presently to be described; allowing the spring 38 to force the rack 37 upwardly, to disengage the contact 44 from the jacks 25 and open circuit to the right turn light 23 at the time the right turn is completed.

To release the lugs 55 and 51 from the notches 47 formed in the rings 45 and 46, respectively, an arm 57 is provided. This arm 57 is pivotally mounted, at its upper end, as at 58, on an upward extension of the wall 49 of casing 17; and it extends downwardly between the slide bars 50 and 53. The lower end portion of arm 57 projects below the casing 17, being extended through a slot 59 (Figs. 5 and 6) formed in the bottom wall of the casing 17.

The steering gear connecting rod 12 is provided with a threaded end portion 60 (Fig. 6) and threaded onto this end portion 60 is an extension 61. Mounted on the extension 61 of connecting rod 12, on opposite sides of the lower end portion of arm 57 and in alignment therewith in a common plane, is a pair of cam fingers 62 and 63.

After the driver of the vehicle has completed a right turn and as he begins to straighten out the front wheels of the vehicle, the steering gear connecting rod 61 is rotated (counterclockwise, Fig. 7) and the cam finger 63 engages the arm 57 and pivots the same to the left (Fig. 7) into engagement with the slide bar 53; thus forcing the slide bar 53 (to the left, Fig. 7) against the action of spring 56, and thereby retracting the lug 55 on the slide bar 53 from engagement in the notch 47 formed in the ring 45. This release of the lug 55 from the notch 47 formed in ring 45 enables the compressed spring 38 to force the rack 37 upwardly, thereby moving the contact 44 from engagement with jacks 25 and thus opening the circuit to the right turn light 23 as the front wheels of the vehicle are straightened out. This upward movement of rack 37 also rotates the gear 31 and its flange 32 (counterclockwise, Fig. 5). During this movement, lug 33 on flange 32 engages the arm 30 and returns the same to its initial position, and this movement of arm 29 rotates shaft 14 and its handle 16 back to their neutral position.

Similarly, after the driver of the vehicle has completed a left turn and begins to straighten out the front wheels of the vehicle, the connecting rod 61 is rotated (clockwise, Fig. 7) and the cam finger 62 engages the arm 57 and pivots the same (to the right, Fig. 7) into engagement with the slide bar 50; thus forcing the lug 78 on the slide bar 50 out of engagement with the notch 47 formed in the ring 46. This release of the lug 78 from the notch 47 formed in the ring 46 enables the compressed spring 42 to force the rack 40 downwardly, thereby moving contact 43 out of engagement with jacks 26 and thus opening circuit to the left turn light 24 as the front wheels of the vehicle are straightened out. This downward movement of rack 40 also rotates the gear 34 and its flange 35, (counterclockwise, looking from right to left, Figs. 3 and 4) and during this movement of flange 35 the lug 36 thereon engages the arm 29 and returns the same to its initial position. At the same time this movement of arm 29 rotates shaft 14 and its handle 16 back to their neutral position.

Provision is made in the present invention for the case wherein the driver, after having moved the handle 16 and shaft 14 to indicate either a right or left turn, changes his mind and for any reason decides not to complete the turn. This might happen for a number of reasons, such as, for example, the driver discovering after having indicated the turn that he is not at the particular corner at which he intended to turn.

To meet this emergency, a pin 64 (Fig. 5) is mounted on each of the slide bars 53 and 50. These pins 64 project through slots 65 (Fig. 8) formed in the wall 49 of casing 17 and each of these pins 64 carries a roller 66 on its outer end portion.

A sector cam plate 67 is slidably mounted on a headed stud 68 which projects from the wall 49 of the casing 17 (Figs. 5 and 8) through a slot 69 formed in the plate 67. This cam plate 67 is urged downwardly, out from engagement with and between the rollers 66, by a spring 70 that is mounted on an arm 71 which projects upwardly from the plate 67. This arm 71 is slidable through an apertured boss 72 formed on the wall 49 of casing 17. Attached to the upper end of arm 71 is a flexible element 73 which is guided over a sheave or pulley 74 that is rotatably mounted on an upward extension of wall 49 of casing 17. The flexible element 73 is attached to a slide bar 75 that is mounted in the dash 76 of the vehicle (Fig. 1).

Assuming that the driver has manipulated handle 16 and shaft 14, and has caused the contact 44 to bridge the jacks 25 and close circuit to the light 23 to indicate a right turn, and then decides not to make the turn: The cam fingers 62 and 63, being dependent upon the movement of the connecting rod 12 for their operation can not in this case reset the circuit closing mechanism to turn off the indicated light, and so the driver then pulls inwardly on the slide bar 75 (Fig. 1), causing the flexible element 73 to raise the cam plate 67, against the action of spring 70, thus moving the cam plate 67 between the rollers 66. This movement of cam plate 67 spreads the slide bars 53 and 50 and releases the lug 55 from engagement in the notch 47 of ring 45, whereupon the spring 38 forces the rack 37 upwardly, thus disengaging the contact 44 from the jacks 25 and opening circuit to the right turn light 23. During this movement, rack 37 rotates gear 41 and flange 32 (counterclockwise, Fig. 5) and the lug 33 on flange 32 engages and rotates arm 30 (counterclockwise, Fig. 5). This movement of arm 30 rotates the shaft 14 (counterclockwise, Fig. 5), this resetting the shaft 14 and handle 16 in neutral position.

If the driver has manipulated handle 16 and shaft 14 to indicate a left turn, and then decides not to make the turn, the same operation of pulling on the slide bar 75 and cord 73 to raise the cam plate 67 will open circuit to the left turn light 24; since when the cam plate 67 is raised up into engagement with the rollers 66 it spreads the slide bars 53 and 50 and forces the lug 78 out of engagement with the notch 47 in ring 46; whereupon the spring 42 forces the rack 40 downwardly, thus disengaging the contact 43 from the jacks 26 and opening circuit to the left turn light 24. During this operation the movement of rack 40 rotates the gear 34 and its flange 35 (counterclockwise, Fig. 6). During this movement the lug 36 on flange 35 engages the arm 29, thereby rotating the arm 29, shaft 14, and handle 16 back to their initial position.

After the cord 73 is released the spring 70 urges the cam plate 67 out of engagement with the rollers 66 and the springs 56 and 52 then force the slide bars 53 and 50, respectively, toward each other and the lugs 55 and 78 into engagement with the rings 45 and 46, respectively.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

I claim:

1. A direction of turn signal light device for vehicles, comprising the combination of a shaft rotatably mounted on the steering column of the vehicle, and a pair of spaced relatively fixed contacts, a slidable rack, a relatively movable contact carried by the rack, a gear floating on the shaft in mesh with the rack, a lug projecting from the gear, and an arm fast upon the shaft adapted for engagement with the lug to rotate the gear and thereby move the rack to move the second-named contact into circuit-closing engagement with the fixed contacts.

2. A direction of turn signal light device for vehicles, comprising the combination of a shaft rotatably mounted on the steering column of the vehicle, and a pair of spaced relatively fixed contacts, a slidable rack, a relatively movable contact carried by the rack, a gear floating on the shaft in mesh with the rack, a lug projecting from the gear, an arm fast upon the shaft adapted for engagement with the lug to rotate the gear and thereby move the rack to move the second-named contact into circuit-closing engagement with the fixed contacts, and a spring urging the rack to move the same and to move the second-named contact out of circuit-closing engagement with the fixed contacts.

3. A direction of turn signal device for vehicles, comprising the combination of relatively stationary contacts, a shaft rotatably mounted on the steering column of the vehicle, a handle on the shaft, relatively movable contacts adapted to engage the stationary contacts to close circuit selectively to said lights, companion mechanisms operatively associated with the shaft for moving the second-named contacts selectively into circuit-closing engagement with the stationary contacts, each of said mechanisms including a rack and said racks supporting the movable contacts, a gear floating on the shaft in mesh with each of said racks, and means fast in the shaft for rotating each of the gears.

4. A direction of turn signal device for vehicles, comprising the combination of a stationary contact, a second stationary contact, a shaft rotatably mounted on the steering column of the vehicle and a handle on the shaft, a pair of slidable racks and a movable contact on each of the same, gears floating on the shaft in mesh with the racks, and means fast on the shaft for rotating each of the gears to selectively engage the movable contacts with the stationary contacts.

5. A direction of turn signal device for vehicles, comprising the combination of a stationary contact, a second stationary contact, a shaft rotatably mounted on the steering column of the vehicle and a handle on the shaft, a pair of slidable racks and a movable contact on each of the same, gears floating on the shaft in mesh with the racks, means fast on the shaft for rotating each of the gears to selectively engage the movable contacts with the stationary contacts, and means associated with each of the gears for selectively latching the same and the rack in mesh therewith in position to hold the movable contact on the latter in circuit-closing engagement with the corresponding stationary contact.

6. A direction of turn signal device for vehicles, comprising the combination of a stationary contact, a second stationary contact, a shaft rotatably mounted on the steering column of the vehicle and a handle on the shaft, a pair of slidable racks and a movable contact on each of the same, gears floating on the shaft in mesh with the racks, means fast on the shaft for rotating each of the gears to selectively engage the movable contacts with the stationary contacts, means associated with each of the gears for selectively latching the same and the rack in mesh therewith in position to hold the movable contact on the latter in circuit-closing engagement with the corresponding stationary contact, and means operable by the steering gear connecting rod of the steering apparatus of the vehicle for releasing said latching means from latching engagement with said gears.

7. A direction of turn signal device for vehicles, comprising the combination of a stationary contact, a second stationary contact, a shaft rotatably mounted on the steering column of the vehicle and a handle on the shaft, a pair of slidable racks and a movable contact on each of the same, gears floating on the shaft in mesh with the racks, means fast on the shaft for rotating each of the gears to selectively engage the movable contacts with the stationary contacts, means associated with each of the gears for selectively latching the same and the rack in mesh therewith in position to hold the movable contact on the latter in circuit-closing engagement with the corresponding stationary contact, means operable by the steering gear connecting rod of the steering apparatus of the vehicle for releasing said latching means from latching engagement with said gears, and a spring urging each of the racks and the movable contact carried thereby away from the corresponding stationary contact.

8. A direction of turn signal device for vehicles, comprising the combination of a stationary contact, a second stationary contact, a shaft rotatably mounted on the steering column of the vehicle and a handle on the shaft, a pair of slidable racks and a movable contact on each of the same, gears floating on the shaft in mesh with the racks, means fast on the shaft for rotating each of the gears to selectively engage the movable contacts with the stationary contacts, means associated with each of the gears for selectively latching the same and the rack in mesh therewith in position to hold the movable contact on the latter in circuit-closing engagement with the corresponding stationary contact, and means for releasing said latching means from latching engagement with said gears.

9. A direction of turn signal device for vehicles, comprising the combination of a stationary contact, a second stationary contact, a shaft rotatably mounted on the steering column of the vehicle and a handle on the shaft, a pair of slidable racks and a movable contact on each of the same, gears floating on the shaft in mesh with the racks, means fast on the shaft for rotating each of the gears to selectively engage the movable contacts with the stationary contacts, means associated with each of the gears for selectively latching the same and the rack in mesh therewith in position to hold the movable contact on the latter in circuit-closing engagement with the corresponding stationary contact, a flexible element having a hand grip at one end thereof on the dash of the vehicle, and a cam plate attached to the other end of the flexible element for releasing said latching means from latching engagement with said gears.

ANDREW C. KOSTKA.